UNITED STATES PATENT OFFICE.

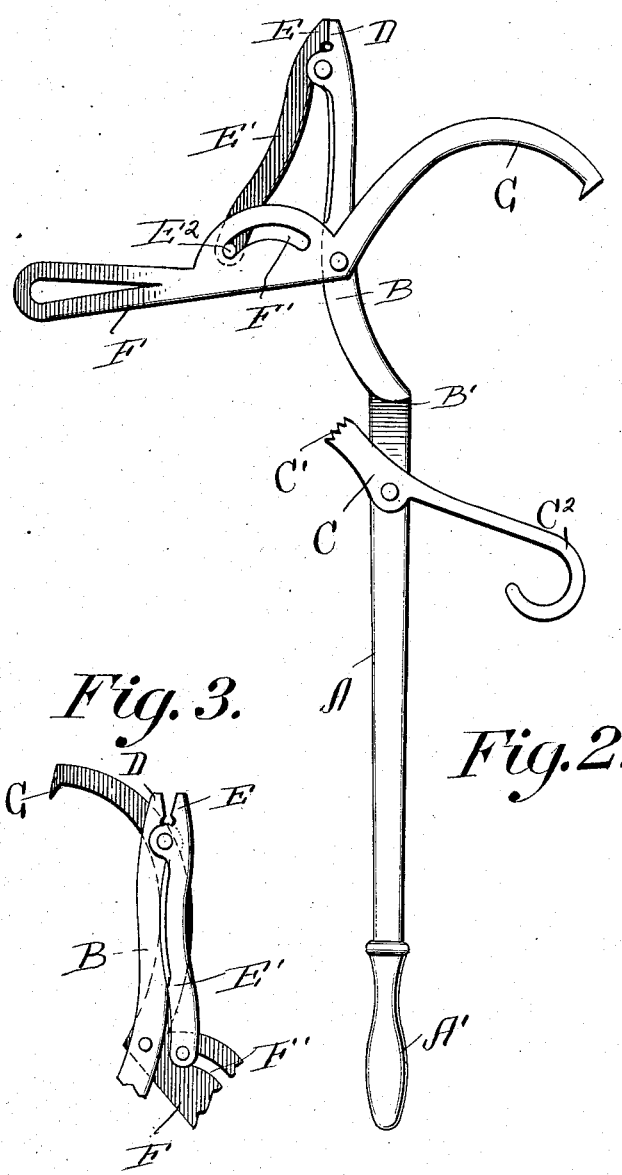

DANIEL JOSEPH O'CONNOR, OF PARRY SOUND, ONTARIO, CANADA.

WIRE-STRETCHER.

No. 900,665.  Specification of Letters Patent.  Patented Oct. 6, 1908.

Application filed October 12, 1907. Serial No. 397,205.

*To all whom it may concern:*

Be it known that I, DANIEL JOSEPH O'CONNOR, a subject of the King of Great Britain, at present residing at Parry Sound, Province of Ontario, Dominion of Canada, have invented a new and useful Improvement in Wire-Stretchers, of which the following is a specification.

This invention relates to wire stretchers the object being to provide a combined wire stretcher, fence splicer, wire cutter and take-up in one tool which is exceedingly simple and cheap in construction, and one which is very effective in putting up wire fences.

Another object of my invention is to provide very novel means for operating the cutters and pincers, whereby a loop can be formed in the wire so as to take up the slack.

With these and other objects in view, the invention consists in the novel features of construction, combination and arrangement of parts, hereinafter fully described and pointed out in the claims.

In the drawing forming a part of this specification:—Figure 1 is a plan view of my improved stretcher showing the pincers in an opened position. Fig. 2 is a plan view of the same showing the pincers in a closed position. Fig. 3 is a detail plan view of the pincers.

In the drawing A indicates a lever provided with a handle A' at one end, and an integral curved-shank B at its other end, which is off-set forming a shoulder B' against which the wire to be stretched is adapted to be clamped by a dog C, pivotally mounted on the lever and provided with biting teeth C' adapted to engage the wire, and prevent it from slipping, the dog being provided with a curved handle $C^2$ for operating the same, and it will be seen that the dog will be drawn against the shoulder by the tension of the wire, as will be hereinafter fully described.

The shank is provided with a jaw D at its end, and laterally projecting apertured lugs, between which a co-acting jaw E is pivoted, the two jaws being provided with notches which are sharpened to form wire-cutters, so that a piece of wire can be readily cut off, or the wire grasped by the jaws so as to form a loop. The jaw E is provided with a shank E' carrying a pin $E^2$ at its end, which works in a curved slot F' of a handle F, which is pivotally mounted on the shank B and is provided with a hook G adapted to engage the post, when a strand of wire is being stretched, and it will be seen that by placing the hook around the post and drawing the wire against the shoulder forcing the dog against the same, that when the lever is drawn toward the operator, the wire will be drawn taut. It will also be seen that when the handle is thrown down, the pin will ride in the curved slot and open the jaws, and by forcing the handle upwardly, the jaws will be brought together, so as to grip a piece of wire and cut the same.

Having thus fully described my invention, what I claim as new and desire to secure by Letters Patent is:—

1. A device of the kind described comprising a lever having a curved shank terminating in a jaw, wire gripping means carried by said lever, a post engaging means carried by said shank and movable thereon, and a coöperating jaw, pivotally connected to the shank and slidably connected to the post engaging means.

2. A tool of the kind described comprising a lever, having an integral shank at one end, offset to form a shoulder and provided with a handle at the other end, said shank having a jaw formed at its end, a pivoted jaw mounted on said shank provided with a shank carrying a pin, a handle mounted on the fixed shank provided with a curved slot in which the pin of the pivoted shank works, a post engaging hook carried by said handle, and a pivoted dog mounted on the lever adjacent the shoulder of the shank, for the purpose set forth.

DANIEL JOSEPH O'CONNOR.

Witnesses:
JNO. J. BOLTON,
JOS. A. STANTON.